April 14, 1925.

W. E. KILLINGER 1,533,922

PLANT SHREDDING MACHINE

Original Filed Sept. 18, 1923  4 Sheets-Sheet 1

INVENTOR.
William Edwin Killinger.

BY
ATTORNEY.

April 14, 1925.

W. E. KILLINGER

PLANT SHREDDING MACHINE

Original Filed Sept. 18, 1923   4 Sheets-Sheet 3

1,533,922

INVENTOR.
William Edwin Killinger.
BY
ATTORNEY.

April 14, 1925.

W. E. KILLINGER 1,533,922

PLANT SHREDDING MACHINE

Original Filed Sept. 18, 1923  4 Sheets-Sheet 4

INVENTOR.
William Edwin Killinger

BY Chas. J. Williamson
ATTORNEY.

Patented Apr. 14, 1925.

1,533,922

UNITED STATES PATENT OFFICE.

WILLIAM EDWIN KILLINGER, OF OKLAHOMA CITY, OKLAHOMA.

PLANT-SHREDDING MACHINE.

Application filed September 18, 1923, Serial No. 663,455. Renewed February 20, 1925.

*To all whom it may concern:*

Be it known that I, WILLIAM E. KILLINGER, residing at Oklahoma City, Oklahoma, a citizen of the United States, have invented certain new and useful Improvements in Plant-Shredding Machines, of which the following is a specification.

Broom corn is now selling at so high a price that the manufacture of brooms is seriously hindered and to such an extent indeed that numerous factories have closed for want of broom making material. This condition has created the necessity of using some substitute for broom corn, which may be obtained in abundance and which will be a satisfactory substitute. In certain parts of the United States a plant grows abundantly of many varieties under different names, such as bear grass and soap weed, the family or genus being known as Palmillo. This plant grows in blades or stalks from twenty-four inches to seventy-two inches long, and when shredded results in a product that has all the properties required to make satisfactory brooms, scrub brushes and the like. Indeed the product makes a better broom than broom corn. To my knowledge attempts to shred the blades or leaves of this plant for the purpose I have stated have failed, because they resulted in destroying the texture of the fiber so that the resulting product was valueless for brooms and brushes. By my invention I am able successfully and economically to shred these plants and thus produce a product of great commercial value for the manufacture of brooms and brushes. My invention consists in whatever is defined by or is included within the meaning or scope of the appended claims.

Figure 1:
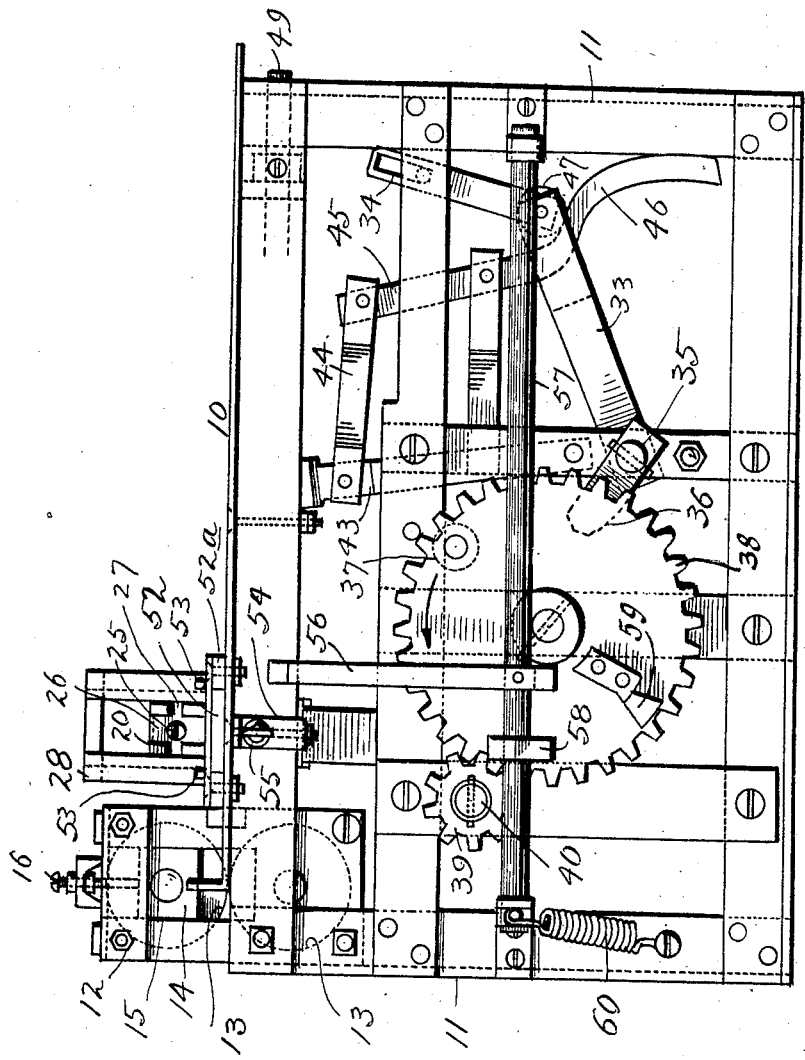
Fig. 1 is a side elevation of a machine embodying my invention.
Figure 2:
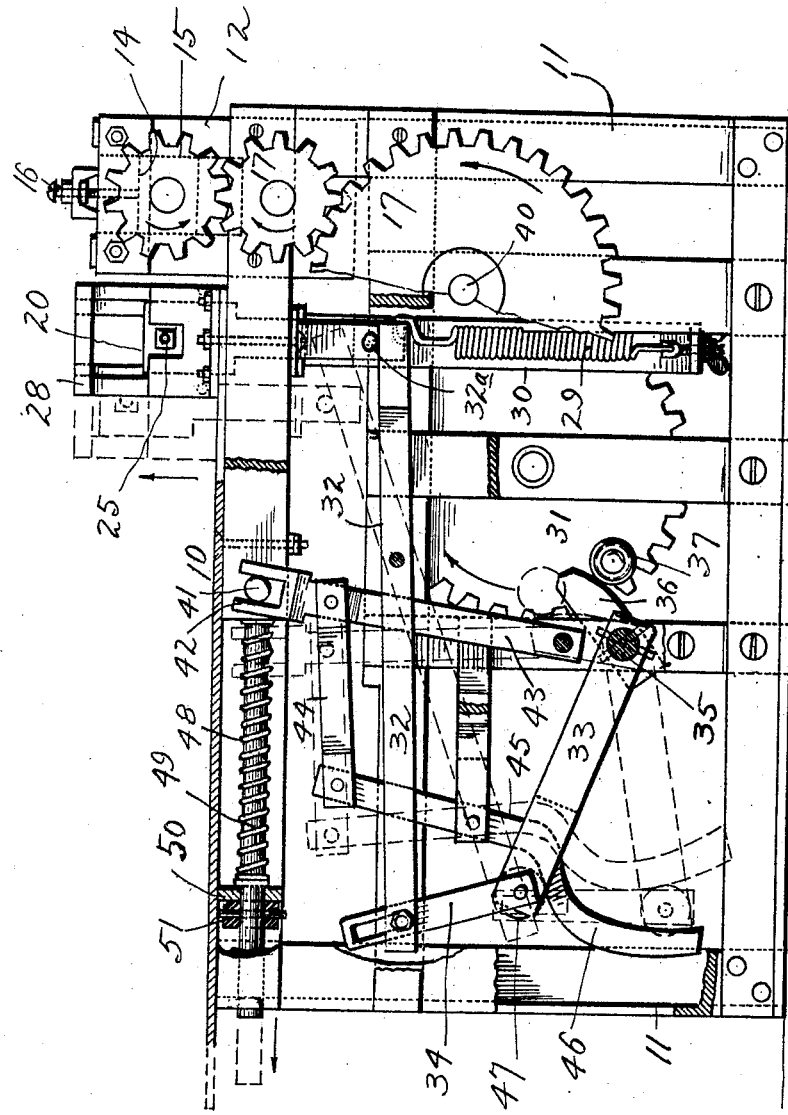
Fig. 2 is a similar view of the opposite side of the machine with parts in section.
Figure 3:
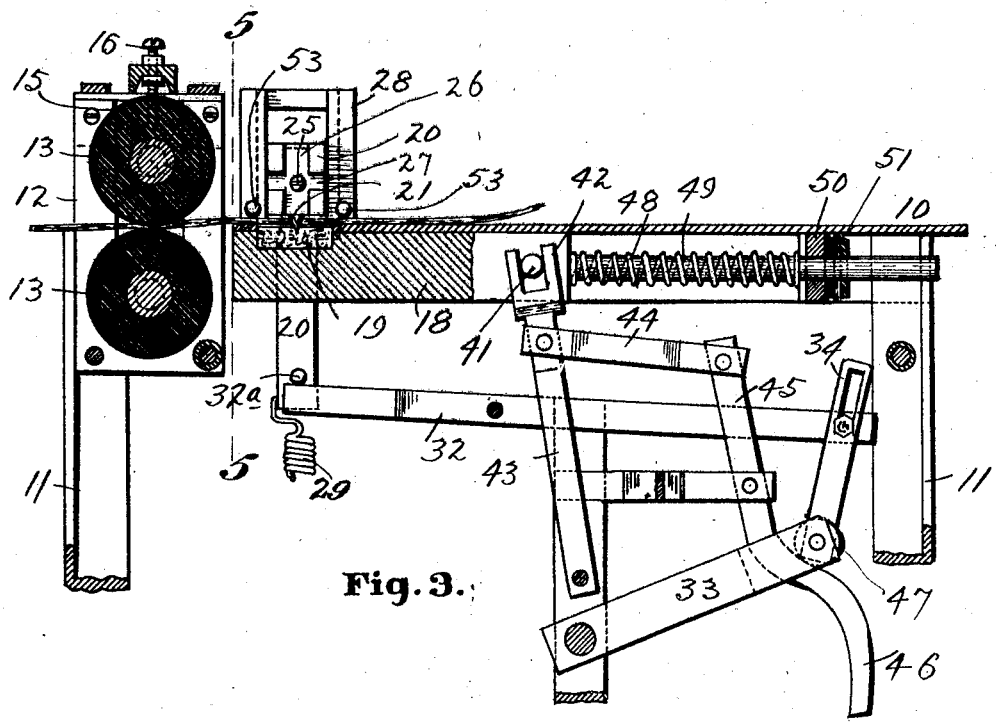
Fig. 3 is a section on the line 3—3 of Fig. 4.
Figure 4:
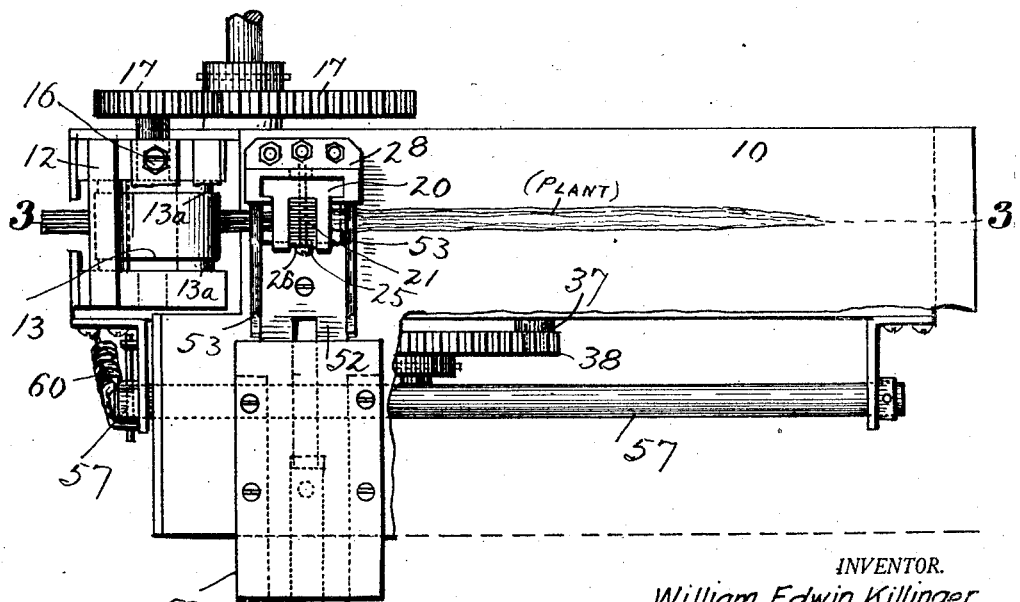
Fig. 4 is a top plan view of the machine.
Figure 6:
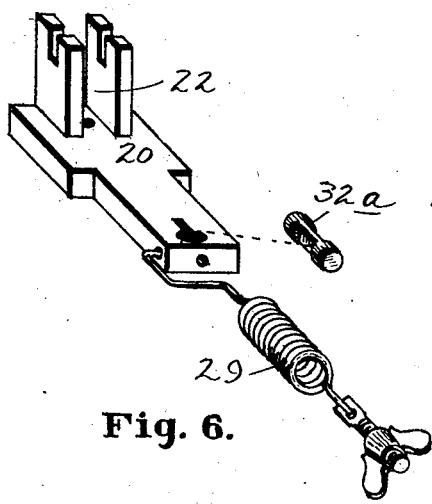
Fig. 6 is a detail view in perspective of the reciprocating knife carrier.
Figure 5:
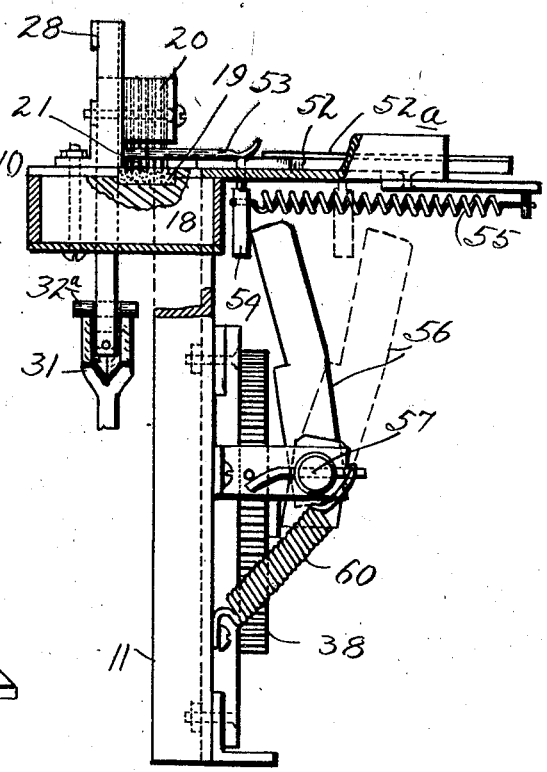
Fig. 5 is a section on the line 5—5 of Fig. 3.
Figure 7:
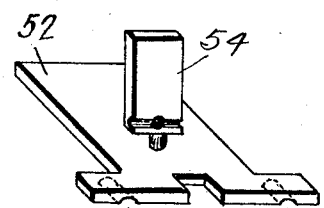
Fig. 7 is a similar view of the feed plunger.
Figures 8, 9, 10:
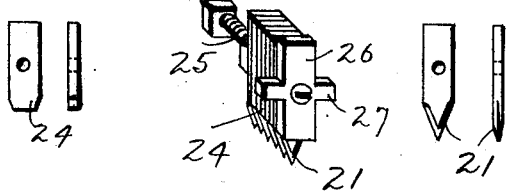
Figs. 8, 9 and 10 are detail views of the members of the slitting device.
Figure 11:
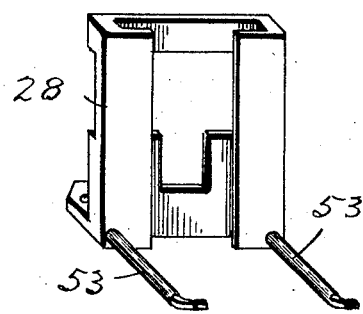
Fig. 11 is a detail view in perspective of the vertical knife carrier guide.

Generally described my invention, in what I consider at the present time its best embodiment, comprises a side by side series of cutters or knives which are spaced apart the thickness of the shreds into which a leaf or blade is to be cut; means to feed a leaf or blade at a time longitudinally with the knives raised to allow the blade to be placed beneath the knives a short distance from the end, so the end will not be engaged and cut by the knives; feed rollers for drawing the blade past the knives with the knives penetrating the same to form the shreds; and mechanism by which the knives shall be moved to and from plant-engaging position alternately, with a reciprocating feed movement of the means for initially passing the advancing end of the plant into the bite or grip of the feed rolls by which the feeding movement for slitting is accomplished.

Proceeding now with a detail description of what is shown in the drawings I mount my mechanism upon a bench-like support which comprises a horizontal bed or table, 10, and supporting legs, 11, at each end thereof and upon the table at or near one end there is a vertical frame, 12, that includes spaced side plates between which a pair of feed rollers, 13, one above the other are mounted, the upper roller being mounted at each end in a block, 14, that is vertically slidable in the slot, 15, of the frame, 12, so that by adjusting screws, 16, the upper roller may be adjusted toward and from the lower roller to give the desired grip of the two rollers upon the plant to be shredded. A train of gears, 17, receiving motion from a crank or otherwise is mounted on one side of the frame, 12, from which the rollers are rotated. Each roller has a periphery or covering of rubber and at each end the rubber covering is supported by a flange or collar, 13, of inelastic material such as hard fiber to prevent longitudinal expansion or extension of the rubber from the compression or pressure upon it in a feeding operation.

On top of a carriage, 18, which is mounted to reciprocate horizontally of the table, 10, is a bed, 19, of some yieldable material such as leather, which the points of the knives may enter over which the plant to be slit or shedded passes and above such bed and moving horizontally with carriage, 18, by which it is supported is a vertically reciprocating block or head, 20, to which the knives, 21, in spaced relation are secured. The knife block, 20, has a vertically extending rectangular hole or opening, 22, in which the shanks, 23, of the knives and spacing plates, 24, are placed, and the knives and spacing plates are secured in such hole by a clamp comprising a screw, 25, passing through holes in knife shanks and spacers and a plate, 26, at one end of the block, 20, and having lugs, 27, that engage slots in the block. The knives are sharply pointed to provide penetrating and cutting or slitting ends, the pointed portions protruding the desired distance beyond the block, 20.

The knife block or carrier, 20, is mounted to reciprocate vertically in a vertical guide frame, 28, fixed to the carriage, 18, and the lower end of the carrier is attached to one end of a coil spring, 29, which normally and yieldingly moves the knife carrier downward to force the points of the knives through the plant and yieldingly to hold it in such position, the lower end of such spring being attached to a relatively stationary part of the frame, such as a vertical bar, 30.

Pivoted between a pair of horizontal frame bars, 31, is a lever, 32, which has a forked end to straddle the bottom of the carrier, beneath projections, 32ª, thereon and is adapted when the forked portion of the lever is rocked upward to engage and lift the knife carrier and thereby to lift the knives clear of a plant being fed into the machine. Such movement of the lever, 32, is produced automatically by a lever, 33, connected at one end by a slotted link, 34, with lever, 32, and fixed to a rock shaft, 35, which has a crank arm, 36, in the path of a lug or roller, 37, on the side of a gear wheel, 38, which receives motion from a pinion, 39, on the shaft, 40, of the driving gear, of the train, 17. When by the revolution of gear, 38, the roller, 37, passes out of contact with crank arm, 36, the pull of spring, 29, moves the knives downward into engagement with the fiber.

The plant to be operated on is laid by the operator on the top of carriage, 18, a short distance beyond the bed, 19, so that when the plant is moved forward it is thrust between the feed rollers, which carries the plant past the knives with the knives penetrating the same to slit or shred it. The carriage has on opposite sides studs, 41, that are engaged by the fork, 42, of a lever, 43, pivoted to the machine frame which is connected by a link, 44, with a lever, 45, having a cam portion, 46, engageable by a roller, 47, on lever, 33, as the latter swings downward to rock lever, 41, in the direction to retract carriage, 18, from the feed rollers and against the pressure of the coil spring, 48, which surrounds a rodlike extension, 49, of the carriage, bearing at one end against a shoulder on the latter and at the other end against cross bar, 50, which is fixed to bed, 10, the rod, 49, passing through said cross bar and beyond the latter having a collar, 51, of rubber or the like to form a cushioned stop for the carriage when moved by the spring.

It will be seen, as the knives reciprocate with the carriage, 18, that after the blade to be shredded has been inserted beneath the lifted knives and over the bed, 19, the required distance beyond the latter, and thereafter the knives permitted to descend upon the blade and penetrating the same, the blade being thereby held in a fixed position on the carriage, the ensuing forward movement of the carriage toward the feed rollers will carry the blade into the bite or grip of the feed rollers.

A feed device acting laterally on the strip of fiber or plant is provided to place it properly under the knives before the latter descend. Such device comprises a horizontal plate-like plunger, 52, mounted to slide in a guide, 52ª, that extends crosswise of the machine in line with the knives, which in its fiber feed movement passes beneath a pair of fingers, 53, that project horizontally from the knife guide, 28, to prevent the fiber lifting from the bed. On its underside the slide has a lug, 54, to which is attached one end of a spring, 55, that retracts the slide, and which lug is engageable by a lever, 56, for movement in the opposite or feed direction. The lever, 56, is on a rock shaft, 57, having a crank arm, 58, in the path of a lug, 59, on the side of the gear wheel, 38, which thus moves the rock shaft in one direction. Its opposite movement is caused by a spring, 60.

What I claim is:

1. A plant shredding machine comprising a slitting device, a plant supporting bed, the slitting device and bed being separable to allow passage of the plant between them without contact with the slitting device, and means to draw the plant through the slitting device when the latter penetrates the plant, whereby a portion of the plant is left intact while another portion is shredded, the bed and the slitting device being movable together towards the drawing means to deliver the plant to such drawing means.

2. A plant shredding machine comprising a slitting device, a plant supporting bed, the slitting device and bed being separable to allow passage of the plant between them without contact with the slitting device, means to draw the plant through the slitting device when the latter penetrates the plant whereby a portion of the plant is left intact while another portion is shredded the bed and the slitting device being movable together towards the drawing means to deliver the plant to such drawing means, means yieldingly to hold the cutting device in plant slitting position, and means to move said cutting device away from such position.

3. A plant shredding device comprising a slitting device a plant drawing means beyond the slitting device, and means to move the slitting device while in engagement with the plant towards the plant drawing means.

4. A plant shredding device comprising a slitting device, a plant supporting bed, the slitting device and bed being separable, to allow passage of the plant between them, without contact with the slitting device, longitudinally of the plant and means acting on the plant transversely of its length to position it with reference to the slitting device.

5. A plant shredding device comprising a slitting device, a plant supporting bed, the slitting device and bed being separable, to allow passage of the plant between them, without contact with the slitting device, longitudinally of the plant and means acting on the plant transversely of its length to position it with reference to the slitting device, the movements of the slitting device and said adjusting means being automatic.

6. A plant shredding device comprising a horizontal bed, a pair of feed rollers, a vertically reciprocating slitting device mounted on said bed and means for moving said bed and slitting device towards and from said feed rollers.

7. A plant shredding device comprising a plant supporting bed movable horizontally, a pair of stationarily supported feed rollers and a vertically reciprocating device partaking of the horizontal movement of said bed.

8. A plant shredding device comprising a plant supporting bed movable horizontally, a pair of stationarily supported feed rollers and a vertically reciprocating device partaking of the horizontal movement of said bed and a plant engaging device reciprocable transversely of the direction of movement of said bed.

In testimony whereof I hereunto affix my signature.

WILLIAM EDWIN KILLINGER.